Dec. 8, 1964 G. STRULL 3,160,828

RADIATION SENSITIVE SEMICONDUCTOR OSCILLATING DEVICE

Filed Jan. 25, 1960 2 Sheets-Sheet 1

WITNESSES

Edwin E. Bassler

Charles L. Menzemer

INVENTOR

Gene Strull

BY

Frederick Shapoe

ATTORNEY

United States Patent Office 3,160,828

Patented Dec. 8, 1964

3,160,828
RADIATION SENSITIVE SEMICONDUCTOR OSCILLATING DEVICE

Gene Strull, Pikesville, Md., assignor to Westinghouse Electric Corporation, East Pittsburgh, Pa., a corporation of Pennsylvania Filed Jan. 25, 1960, Ser. No. 4,398
12 Claims. (Cl. 331—111)

This invention relates generally to a radiation sensitive semiconductor device, and more specifically to a five-region, monolithic, radiation sensitive-pulse generating semiconductor device.

An object of the present invention is to provide a five-region, monolithic, radiation sensitive-pulse generating semiconductor device.

A still further object of the invention is to provide an electronic member comprising a p-n-p-n (or n-p-n-p) element electrically connected to a n-p (or p-n) element, the two elements being correlated so that the saturation current of the n-p element is within the negative resistance region of the p-n-p-n element, the electronic member generating pulses when energized with direct current passing through both elements, and the member is radiation sensitive at either of the elements such that the frequency of the pulses varies with the intensity of radiation and the point of application.

Another object of the present invention is to provide an n-p-n-p-n (or p-n-p-n-p) unitary, radiation sensitive semiconductor device which, when connected across a source of direct current, oscillates at a first frequency in darkness and at another frequency when struck by radiation, especially in the range of from infrared to higher frequencies, the latter frequency can either be higher or lower than the first frequency.

Another object of the present invention is to provide an n-p-n-p-n (or p-n-p-n-p) monolithic radiation sensitive semiconductor device which, when connected across a source of direct current, oscillates at a first frequency in darkness and at another frequency when struck by light and in which all storage and pulse forming facilities are contained in the monolithic semiconductor structure.

Still another object of the present invention is to provide an optical sensing system consisting in part of at least one n-p-n-p-n (or p-n-p-n-p) semiconductor device which, when connected across a source of direct current, oscillates at a first frequency in darkness and at another frequency when struck by light, and in which all storage and pulse forming facilities are contained within the monolithic semiconductor structure.

Other objects of the present invention will, in part, appear hereinafter and will, in part, be obvious.

For a better understanding of the nature and objects of this invention, reference should be had to the following detailed description and drawings, in which:

FIGURE 1 is a side view, in cross section, of a wafer of semiconductor material;

FIGS. 2 and 3 inclusive are side views, in cross section, of the wafer of FIG. 1 undergoing various treatments in accordance with the teachings of this invention;

Figure 1:
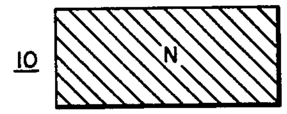

In accordance with the present invention and attainment of the foregoing objects, there is provided an electronic member comprising a p-n-p-n (or n-p-n-p) element having a negative resistance region electrically connected to an n-p (or p-n) element, the two elements being so constructed that they are correlated in that the saturation current of the n-p element is within the negative resistance region of the p-n-p-n element. The two elements can be (1) physically separated and connected by external electrical conductors, or (2) they may be joined in sandwich fashion or (3) they may be in a single monolithic structure in which both share an n- or p-region and the complete monolith is a five-region device. When separate elements are used they may be prepared from the same semiconductor material such as germanium or silicon or from different semiconductor materials, in the latter case the p-n-p-n element may be prepared from silicon or germanium, while the n-p element may be prepared from a different material selected from silicon carbide, silicon, germanium, III–V or II–VI compounds such as indium arsenide, or bismuth selenide telluride. To provide for radiation sensitivity the junctions of the p-n element and the junctions of p-n-p-n elements should be exposed. More particularly, the five-region, monolithic, radiation sensitive-pulse generating semiconductor device when energized from a suitable direct current source, comprises a body of a semiconductor material having a first type of semiconductivity, a thin layer of a second type of semiconductive material present on said body and forming a p-n junction therewith, a layer of a first type of semiconductive material disposed upon one surface of said thin layer and forming a p-n junction therewith, a surface area of the aforesaid body of semiconductor material being open, a portion of said open surface having a layer of a second type of semiconductivity disposed thereon, and said last-mentioned layer of second type semiconductivity having disposed thereon a superimposed layer of said first type semiconductivity to provide a p-n junction therebetween, the p-n junction at the superimposed layer being exposed to receive radiation thereon. If only pulse generation is desired, the device need not have exposed areas. The device can be potted or sealed in a hermetic container. Quartz or glass can be employed to seal the device and to enable radiation of the desired type to reach the exposed areas.

By selecting certain materials, a device may be made that is sensitive to selected portions of a wide range of radiation from infra-red through the visible spectrum to ultra-violet and even to X-rays and higher frequencies.

The presence of the radiation is evidenced by a change in frequency of the pulses generated when the device is energized by direct current. The frequency change is proportional to the light intensity, and the point of application as will be explained hereinafter.

For the purpose of simplicity and clarity, the teachings of this invention will be set forth generally in terms of a silicon n-p-n-p-n semiconductor device. It will be understood, however, that the teachings of this invention are applicable as well to devices of any semiconductor material and particularly those comprised of germanium, silicon carbide, stoichiometric compounds of elements of group III and group V of the periodic table, for example indium arsenide, indium antimonide, gallium arsenide, and gallium antimonide, and stoichiometric compounds of group II and group VI of the periodic table, for example cadmium sulphide of either n-p-n-p-n or p-n-p-n-p configuration.

With reference to FIG. 1, there is illustrated a silicon wafer 10 of n-type semiconductivity. The doped wafer 10 may be prepared by any of the methods known to those skilled in the art. For example, a doped silicon rod may be pulled from a melt comprised of silicon and at least one element from group V of the periodic table, for example, arsenic, antimony or phosphor. The wafer 10 is then cut from the rod with, for example, a diamond saw. The surfaces of the wafer may then be lapped or etched or both to produce a smooth surface after sawing.

The radiation sensitive device of this invention can also be fabricated from a dendrite which has been prepared in accordance with U.S. patent application Serial No. 844,288 filed October 5, 1959, the assignee of which is the same as that of the present application.

The wafer 10 is then disposed in a diffusion furnace. The hottest zone of the furnace is at a temperature within the range of 1000° C. to 1300° C. and has an atmosphere of the vapor of an acceptor doping material, for example, indium, gallium, aluminum or boron. The zone of the furnace which the crucible of said acceptor impurity lies may be at a temperature of from 200° C. to 1300° C., the specific temperature being selected to insure the desired vapor pressure and surface concentration of diffusant from the crucible. The acceptor impurity diffuses into all the surfaces of the n-type silicon wafer.

Figure 2:
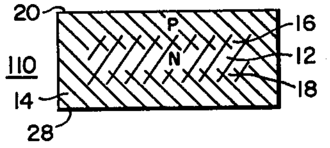

With reference to FIG. 2, there is illustrated a wafer 110 which is the n-type wafer of FIG. 1 after diffusion of the doping impurity to a select depth through all surfaces of the wafer. The wafer 110 is comprised of the central n-type region 12 surrounded by a thin p-type surface layer 14. There is a p-n junction 16 between the top surface of region 12 and layer 14, and a p-n junction 18 between the bottom surface of region 12 and layer 14. The wafer comprises a top surface 20 and a bottom surface 28.

P-type layer 14 must be deep enough to permit diffusion of additional layers of impurities therein without penetration through the p-type layer 14 to the n-type region 12. The p-type layer 14 should not be so deep, however, as to substantially increase the forward voltage drop of the finished semiconductor device. A depth or thickness of from 0.75 mil to 1.5 mils, preferably about 1 mil, for the layer 14 has been found satisfactory for the device of this invention.

Figure 3:
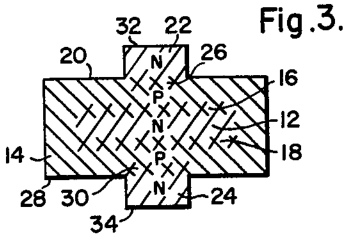

Referring to FIG. 3, layers 22 and 24 of n-type semiconductivity are then formed by disposing a donor doping material or alloy, preferably in the form of a foil or pellet having a thickness of about 0.75 mil to 2 mils, upon the top surface 20 and the bottom surface 28 of thin p-type layer 14 respectively, and fusing the foils or pellets to the p-type layer 14 by heating in a vacuum or inert atmosphere, for example, in an argon or helium atmosphere at a temperature of from 500° C. to 900° C. Care must be taken that layers 22 and 24 do not penetrate through p-type layer 14 to n-type region 12.

Examples of suitable doping materials or alloys of which the n-type layers 22 and 24 may be comprised include arsenic, antimony, and alloys thereof, such for example as alloys of gold and antimony or arsenic. For instance, a foil of an alloy comprising 99.5% by weight, gold and 0.5%, by weight, antimony is suitable.

A p-n junction 26 is formed between p-type layer 14 and n-type layer 22, and a p-n junction 30 is formed between p-type layer 14 and n-type layer 24 following fusion of the n-type layers 22 and 24 to surface 20 and surface 28 of p-type layer 14 respectively. The n-type layer 22 has a top surface 32. The n-type layer 24 has a bottom surface 34.

N-type layers 22 and 24 may also be formed by suitably masking a predetermined area of surfaces 20 and 28 of p-type layer 14 and introducing a suitable n-type doping material onto the unmask areas by vapor diffusion thereat.

Figure 4:
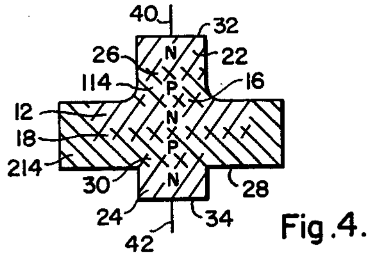
FIG. 4 is a side view, in cross section, of the five-region, monolithic, radiation sensitive-pulse generating semiconductor device of this invention.

Top-surface 32 of the n-type layer 22 is suitably masked, with for example an organic wax, and the top surface 20 of thin p-type layer 14 is etched away to layer 12. The etching is carried out until the p-type region 14 is separated into a top portion 114 and a bottom portion 214 to produce the structure as illustrated in FIG. 4. Thereby electrical current flows from n-type layer 22 to p-type layer 114 through the p-n junction 26 and from n-type region 12 to p-type layer 214 through the p-n junction 18.

In FIG. 4, the amount of material removed by etching has been exaggerated for purposes of clarity. The device configuration of FIG. 5 however, is suitable for use, but it is not necessary to remove as much of p-type layer 14 as is illustrated. Thus, only a channel surrounding n-type layer 22 need be etched through p-type layer 14 to expose the n-type region 12. That portion of the p-type layer 14 disposed between the bottom of the n-type layer 22 and the top surface of the n-type region 12 is not affected by the etching process.

The etchant employed may be any suitable reagent known to those skilled in the art for etching silicon, for example, a mixture of nitric acid, hydrofluoric acid and acetic acid (CP4).

Electrical leads or contacts 40 and 42 are joined to the n-type layers 22 and 24, respectively, by soldering, brazing or the like. The contacts or leads 40 and 42 may be comprised of any suitable electrical conducting material such as copper, aluminum, silver and the like, and may be of any suitable shape or form.

The semiconductor device illustrated in FIG. 4 is a five-region, monolithic, radiation sensitive, pulse generating semiconductor device which oscillates when connected across the terminals of a D.C. power source, at a first frequency in darkness and at other frequencies when struck by light or other radiation.

The pulse generated by the semiconductor device of FIG. 4 can be taken off from the device into a high impedance circuit in parallel with the device, or the pulse may be passed through a low resistance in series with the semiconductor device.

Figure 5:
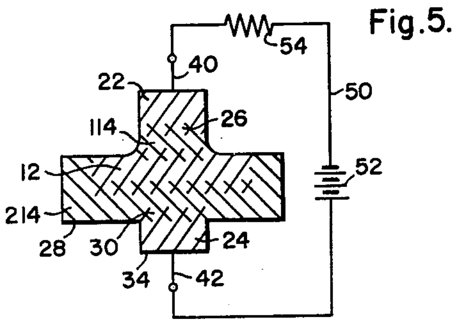
FIG. 5 is a schematic presentation of the semiconductor device of this invention connected in series with a pulse generating inducing electrical current and a resistance.

With reference to FIG. 5, the semiconductor device of FIG. 4 is illustrated connected in series by a conductor 50 with a direct current power source 52 and a low resistance 54. The pulse generated from such a system is a triangular pulse wave having a first frequency when the device is in darkness and at a second frequency when the device, especially p-n junction 26, is struck by light of a given intensity.

Figure 6:
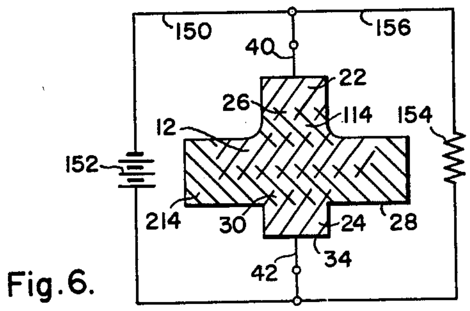
FIG. 6 is a schematic drawing of the semiconductor device of this invention connected in series with a pulse generating inducing current and in parallel with an impedance.

With reference to FIG. 6, the semiconductor device of FIG. 4 is shown connected in series with a direct current source 152 by a conductor 150 and in parallel with an impedance 154 by a conductor 156. In this arrangement the semiconductor device generates a pulse shaped wave having a first frequency when the device is in darkness and at a second frequency when the device, especially the p-n junction 26, is struck by light of a given intensity.

Figure 7:
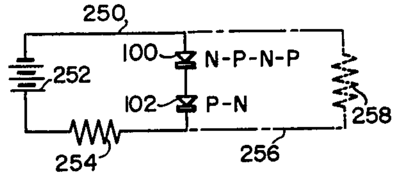
FIG. 7 is a schematic drawing showing the equivalent of the monolithic semiconductor device of this invention in terms of individual and separate semiconductor devices.

With reference to FIG. 7, there is illustrated, in schematic form, the approximate equivalent in individual semiconductor devices, of the structure of FIG. 4. In FIG. 7 an n-p-n-p two terminal device 100 and a p-n two terminal device 102 are shown connected in series by a conductor 250 with a direct current power source 252 and a resistance 254. The two separate devices 100 and 102 if connected as illustrated in FIG. 7 will generate a pulse substantially the same as that generated by the semiconductor device illustrated in FIG. 5. In FIG. 7, the two terminal device 100 and the two terminal device 102 could be connected by a conductor 256 (shown as a dotted line) with an impedance 258 and when biased across a D.C. power source such as source 252 would generate a pulse form substantially the same as that illustrated in FIG. 6.

Figure 8:
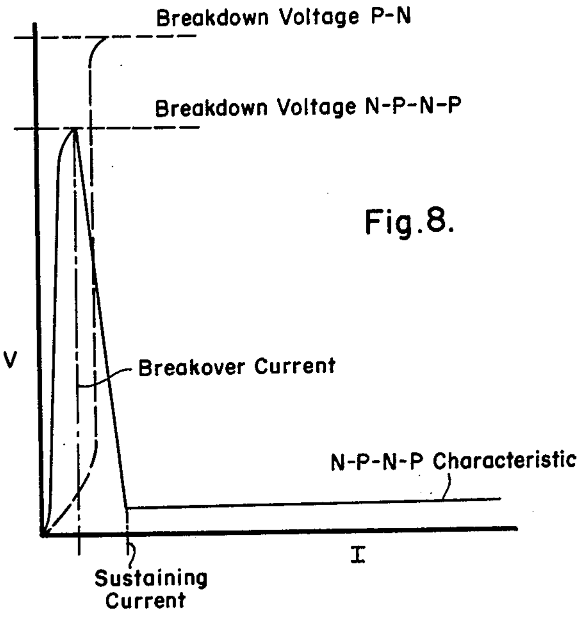
FIG. 8 is a graphical presentation of the I–V characteristics of the device of this invention.

With reference to FIG. 8, there is illustrated the first quadrant I–V characteristic curve of the device of FIG. 4. The characteristic is illustrated in terms of the p-n component and the n-p-n-p component of the device of FIG. 4. The projection of the negative resistance region of the n-p-n-p component on the current axis is bounded by the break over current and the sustaining current. In the device of FIG. 4, the p-n component is fabricated in series with the n-p-n-p component. The p-n component is fabricated so that its break down voltage is greater than the break over voltage of the n-p-n-p component, and so that the saturation current of the p-n component is between the break over current and the sustaining current of the n-p-n-p component.

In operation, the device of FIG. 4 functions as follows: The impressed voltage is increased and the drop is divided in some manner by the n-p-n-p device and the p-n device. At some voltage enough drop will appear across the n-p-n-p component to cause it to break over. As it breaks over, more of the drop will appear across the p-n component, the p-n component must maintain its saturation current to be sufficiently high to prevent it from breaking down under these conditions. After the n-p-n-p component breaks over, the current is held below the sustained current by the characteristic of the p-n component. This causes the n-p-n-p component to turn off, and the cycle is repeated; the result is a sharp clear pulse.

It will be understood that the characteristics set forth graphically in FIG. 8 will vary somewhat depending upon the semiconductor material employed, the thickness of the various regions, and the area exposed to radiation.

The concept that a coordinated two terminal p-n and a two terminal n-p-n-p semiconductor device (or an n-p and p-n-p-n), when connected in series across a D.C. power supply, will oscillate gives rise to many possible telemetering systems.

Figure 9:
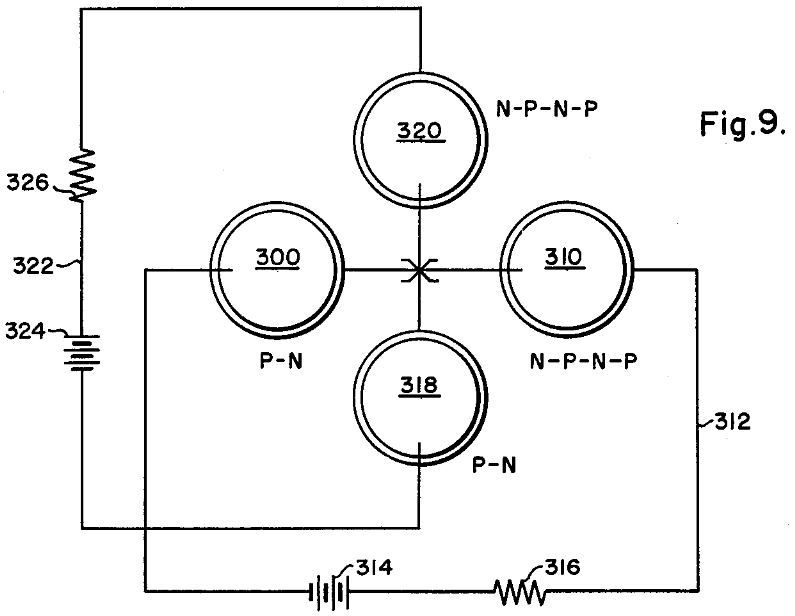
FIG. 9 is a schematic presentation of one possible optical sensing system employing the semiconductor device of this invention.

With reference to FIG. 9, there is illustrated one possible horizontal and vertical (or north-south-east-west) type of telemetering system. The telemetering system of FIG. 9 is comprised of a first unit comprised of a two terminal p-n device 300 and a two terminal n-p-n-p device 310 connected in series by a conductor 312 with a D.C. power source 314 and a resistance 316, and a second unit comprised of a two terminal p-n device 318 and a two terminal n-p-n-p device 320 connected in series by a conductor 322 with a direct current power source 324 and a resistance 326. The first unit comprised of the device 300 and the device 310 will oscillate at a particular frequency in darkness. The second unit comprised of device 318 and 320 will also oscillate at a particular frequency in darkness. The "in darkness" frequency oscillation of the first and second units may or may not be the same, depending on the semiconductor materials involved and so forth as explained above.

If the system of FIG. 9 were installed in, for example, some type of missile or space vehicle, which when on a true and predetermined path a monochromatic light beam, or other radiation would hit point X midway between device 300, 310, 318 and 320, then any deviation from the correct predetermined path could be determined by a change in oscillation resulting from the light beam striking one of the devices 300, 310, 318 or 320. Such a system could function in the following manner: A horizontal deviation from the true course would result in the light striking either device 300 or device 310. Experimentation has shown that if the light struck the p-n device 300 the oscillation frequency would increase, and if the light source struck the n-p-n-p device 310 the oscillation would decrease in frequency. Such a change in oscillation read at resistance 316 could trigger a correction procedure. A change in the oscillation as a result of the light source striking device 318 or 320 which would be read at resistance source 326 could likewise trigger a correction procedure which would return the vehicle to a correct vertical bearing. Since the "in darkness" oscillation of the system varies depending on the material, and thickness of the regions comprising any particular device the system illustrated in FIG. 9 could be comprised of silicon, germanium, silicon carbide, III–V compounds or II–VI compound elements in any combination. For example, elements 300 and 310 could be comprised of silicon and components 318 and 320 comprised of germanium. The result would be a readily discernible difference in oscillation resulting from the light source varying either in the horizontal or vertical direction. Similarly the device could be controlled by infra-red, ultraviolet or other radiation.

Figure 10:
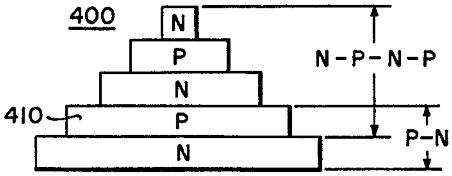
FIG. 10 is a side view, in cross section, of another possible configuration of the semiconductor device of this invention.

With reference to FIG. 10, there is illustrated a five-region, monolithic, radiation sensitive, pulse generating device having another possible configuration. It will be noted that the device of FIG. 10 is a pyramidal configuration which permits heat to be dissipated from a large area bottom region, whereas the device of FIG. 4 has relatively small end regions. In the device 400 of FIG. 10 the n-p-n-p device is disposed concentrically on the p-n device. It will be noted that p-type region 410 is common to both the n-p-n-p and the p-n device. Such a configuration would be quite useful when used to center or focus an optical system. Deviation in centering or focusing can be determined by the change in oscillation resulting from the light striking either the n-p-n-p or p-n area of the device.

Figure 12:
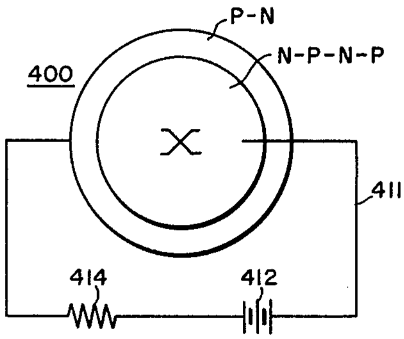
FIG. 12 is a schematic drawing illustrating another possible configuration for the semiconductor device of this invention connected in series with a pulse generating current source and a resistance.

With reference to FIG. 12, there is shown a top view of the device 400 of FIG. 10 connected in series by an electrical conductor 411 with a D.C. power source 412 and a resistance 414. In operation, a monochromatic light source could be focused on point X and the device would oscillate with a particular frequency. If the light source were to become focused on the outer rim of the device, that is strike the p-n component of the device the oscillation as read at the resistance 414 would change and the focusing could be corrected to return the light source to point X.

Figure 11:
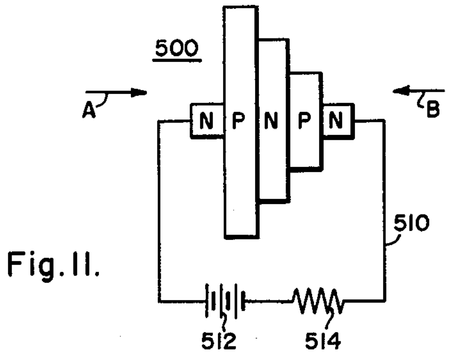
FIG. 11 is a top view schematic presentation of the semiconductor device of FIG. 10 connected in series with a pulse generating inducing D.C. current and resistance.

With reference to FIG. 11, there is shown still another possible configuration of a device 500 comprised of a p-n component and an n-p-n-p component. The device 500 of FIG. 11 is comprised of two devices back to back to obtain a collinear position between 2 light sources A and B, or to sense one light intensity B using a known light source A as a reference.

The following examples are illustrative of the practice of this invention:

*Example I*

A flat circular wafer of n-type silicon having a resistivity of 200 ohm centimeter, and of ¼ inch in diameter at a thickness of 4 mils, was disposed in a diffusion furnace. The diffusion furnace was at a temperature of 1200° C. and had a gallium vapor atmosphere. The gallium was allowed to diffuse into the wafer to a depth of 1 mil. The wafer was then removed from the diffusion furnace. The structure is that illustrated in FIG. 2.

Thereafter, an n-type doping pellet having a diameter of 1/4 inch and comprised of 99.5%, by weight, gold and 0.5%, by weight, antimony was disposed upon the top surface and the bottom surface of the gallium diffused wafer and fused with a p-type gallium layer. Care was exercised to ensure that the pellet did not fuse completely through the gallium layer at either the top or the bottom of the wafer. The structure is that illustrated in FIG. 3.

The upper surface of the n-type layer, formed by fusing the gold-antimony pellet to the top of the wafer, was masked with an organic wax in the upper surface of the structure, was etched with an etchant comprised of nitric acid, hydrofluoric acid and acetic acid and bromine (CP4). The etching removed the gallium diffused layer on the upper surface to avoid short-circuiting therethrough. The structure is that illustrated in FIG. 4.

An electrical contact of silver was then joined to the n-type gold-antimony layers at the top and the bottom of the wafer. The structure is that illustrated in FIG. 5. The structure was then connected by an electrical conductor in series with a D.C. power source and an oscilloscope.

The system was found to have an "in darkness" oscillation frequency of 30 kc. with a pulse width of 0.3 microsecond and a pulse height of 50 volts.

An incandescent light source was allowed to strike the junction between the top n-type layer and the p-type gallium diffused layer. Under incandescent lighting of 400 foot candles the frequency of oscillation became 20 kc. with a pulse width of 0.3 microsecond and a pulse height of 50.

*Example II*

A flat circular wafer of p-type germanium having a resistivity of 20 ohm centimeters, and of 1/8 inch in diameter and a thickness of 5 mils was disposed in a diffusion furnace. The diffusion furnace was at a maximum temperature of 825° C. and had an arsenic vapor atmosphere. The arsenic was allowed to diffuse into the wafer to a depth of 1 mil. The water was then removed from the diffusion furnace. Thereafter, a p-type doping pellet having a diameter of 1/16 inch and comprised of aluminum was disposed upon the top and the bottom surface of the arsenic diffused wafer and fused through the n-type arsenic layer. Care was exercised to ensure that the aluminum pellets did not fuse completely through the arsenic layer.

The upper surface of the p-type layer, formed by fusing the aluminum pellet to the arsenic layer at the top of the wafer was masked with an organic wax in the upper surface of the structure and etched away as in Example I. The etching removed all of the arsenic diffused layer on the upper surface, except that disposed directly below the aluminum p-type layer.

Electrical contacts of silver were then joined to the top and bottom p-type aluminum layers.

The device thus prepared was connected in series with a D.C. power supply and an oscilloscope.

The device had an in darkness oscillation frequency of 100 kc.

An incandescent light source was allowed to strike the device. When the p-n-p-n portion is illuminated the frequency decreased proportional to the intensity of the radiation. When the n-p portion is illuminated the frequency increased proportional to the intensity of the radiation.

The procedure of Examples I and II can be repeated to prepare devices comprised in part of gallium arsenide and cadmium sulfide. Such devices will have a different spectral sensitivity than those of the examples. For example, cadmium sulfide is sensitive from the visible through the X-ray region.

While the invention has been described with reference to particular embodiments and examples, it will be understood that modifications, substitutions and the like may be made therein without departing from its scope.

I claim as my invention:

1. A monolithic five-region radiation sensitive pulse generating semiconductor device comprising a body of a semiconductor material having a first type of semiconductivity, a thin layer of a second type of semiconductivity present on all but one surface of said body and forming a p-n junction with said body, a layer of a first type of semiconductive material disposed upon one surface of said thin layer and forming a p-n junction therewith, a central portion of said one surface of said body having a layer of a second type of semiconductivity disposed thereon, and the said last-mentioned layer of second type semiconductivity having disposed thereon a superimposed layer of said first type semiconductivity to provide a p-n junction therebetween, the p-n junction at the superimposed layer being exposed to receive radiation thereon.

2. A monolithic five-region radiation sensitive pulse generating semiconductor device comprising a body of a semiconductor material selected from the group consisting of silicon, germanium, silicon carbide, stoichiometric compounds of group III and group V of the periodic table and stoichiometric elements of group II and group VI of the periodic table, said semiconductor material having a first type of semiconductivity, a thin layer of a second type of semiconductivity present on all but one surface of said body and forming a p-n junction with said body, a layer of a first type of semiconductive material disposed upon one surface of said thin layer and forming a p-n junction therewith, only a central portion of said one surface of said body having a layer of a second type of semiconductivity disposed thereon, and said last-mentioned layer of second type semiconductivity having disposed thereon a superimposed layer of said first type semiconductivity to provide a p-n junction therebetween, the p-n junction at the superimposed layer being exposed to receive radiation thereon.

3. A monolithic five-region two terminal radiation sensitive pulse generating semiconductor device comprising a first region of a first type of semiconductivity, said first region having the a top surface, a bottom surface, and side surfaces, a second region comprised of a thin layer of second type of semiconductivity disposed about and contiguous with the side surfaces and bottom surface of said first region, a first p-n junction being present between the bottom surface of said first region and said inner bottom surface of said thin layer of second type of semiconductivity, a third region comprised of another thin layer having the second type of semiconductivity with its bottom surface being disposed upon and contiguous with the top surface of said first region and providing a p-n junction therewith, said another thin layer comprising said third region being of lesser cross sectional area than the top surface of said first region so that at least the peripheral portion of the top surface of said first region is exposed, a fourth region comprised of a third layer having a first type of semiconductivity having its bottom surface disposed upon, contiguous and coextensive with the top surface of said another thin layer comprising the third region, to provide a third p-n junction therebetween, a fifth region comprising a bottom layer of first type semiconductivity doping material joined to the outer bottom surface of said mentioned thin layer of second type semiconductivity comprising said second region and a p-n junction therebetween, a first electrical contact affixed to said bottom layer of first type of semiconductivity which comprises said fifth region, and a second electrical contact affixed to the top surface of said third layer of first type of semiconductivity which comprises said fourth region, the exposed p-n junction between the third layer which comprises said fourth region, and said another thin layer, which comprises said third region being adapted to receive radiation.

4. A monolithic five-region two terminal radiation sensitive pulse generating semiconductor device fabricated from a material selected from the group consisting of silicon, germanium, silicon carbide, stoichiometric compounds of group III and group V of the periodic table and stoichiometric compounds of group II and group VI of the periodic table comprising a first region of a first type of semiconductivity, said first region having a top surface, a bottom surface and side surfaces, a second region comprised of a thin layer of second type of semiconductivity disposed about and contiguous with the side surfaces and bottom surface of the first region, a first p-n junction being present between the bottom surface of said first region and said inner bottom surface of said thin layer of the second type of semiconductivity, a third region comprised of another thin layer having a second type of semiconductivity with its bottom surface disposed upon and contiguous with the top surface of said first region and providing a p-n junction therewith, said another thin layer comprising said third region being of lesser cross-sectional area than the top surface of said first region so that at least the peripheral portion of the top surface of said first region is exposed, a fourth region comprised of a third layer having a first type of semiconductivity having its bottom surface disposed upon, contiguous and coextensive with the top surface of said another thin layer comprising the third region to provide a third p-n junction therebetween, a fifth region comprising a bottom layer of first type semiconductivity doping material joined to the outer bottom surface of said first mentioned thin layer of second type semiconductivity comprising said second region and a p-n junction therebetween, a first electrical contact fixed to said bottom layer of first type semiconductivity which comprises said fifth region and a second electrical contact affixed to the top surface of said third layer of first type semiconductivity which comprises said fourth region, the exposed p-n junction between the fourth region and said third region being adapted to receive radiation.

5. A telemetering system comprising in a series circuit relationship the semiconductor device of claim 1 and a D.C. power source, the D.C. power source being connected to the semiconductor device through the superimposed layer and the layer disposed on the said thin layer.

6. A telemetering system comprising in a series circuit relationship the semiconductor device of claim 2 and a D.C. power source, the D.C. power source being connected to the semiconductor device through the superimposed layer and the layer disposed on the said thin layer.

7. A telemetering system comprising in a series circuit relationship the semiconductor device of claim 3 and a D.C. power source, the D.C. power source being connected to the semiconductor device through the second and fifth regions of the device.

8. A telemetering system comprising in a series circuit relationship the semiconductor device of claim 4 and a D.C. power source, the D.C. power source being connected to the semiconductor device through the second and fifth regions of the device.

9. An electronic member comprising a p-n-p-n element having a negative resistance region electrically connected to an n-p element, the electrical connection being made between an end region of each element having the same type of semiconductivity, the saturation current of the n-p element being within the negative resistance region of the p-n-p-n element, said electronic member generating pulses at a first frequency when energized with a direct current, the source of the direct current being connected to the other region of the n-p element and to the other end region of the p-n-p-n element, and at another frequency when subjected to radiation upon either of the elements while being energized by said direct current.

10. An electronic member comprising a p-n-p-n two terminal element having a negative resistance region electrically connected in series with an n-p two terminal element, the electrical connection being made between an end region of each element having the same type of semiconductivity, the saturation current of the n-p element being within the negative resistance region of the p-n-p-n element, said electronic member generating pulses at a first frequency when energized with a direct current from a source connected in series with said member, the source of the direct current being connected to the other region of the n-p element and to the other end region of the p-n-p-n element, and at another frequency when subjected to radiation upon either of the elements while being energized by said direct current.

11. A two terminal electronic member comprising a p-n-p-n element having a negative resistance region electrically connected to an n-p element through a common region, the saturation current of the n-p element being within the negative resistance region of the p-n-p-n element, said electronic member generating pulses at a first frequency when energized with a direct current, the direct current source being connected across the electronic member through the two terminals and at another frequency when subjected to radiation upon either of the elements while being energized by said direct current.

12. A two terminal electronic member comprising a p-n-p-n element having a negative resistance region electrically connected to an n-p region through a common contact, the saturation current of the n-p element being within the negative resistance region of the p-n-p-n element, said electronic member generating pulses at a first frequency when energized with a direct current, the direct current source being connected across the electronic member through the two terminals and at another frequency when subjected to radiation upon either of the elements while being energized by said direct current.

References Cited in the file of this patent

UNITED STATES PATENTS

| | | |
|---|---|---|
| 2,633,806 | Darlington | Dec. 22, 1953 |
| 2,831,126 | Linvill et al. | Apr. 15, 1958 |
| 2,862,416 | Doyle | Dec. 2, 1958 |
| 2,890,353 | Overbeek et al. | June 9, 1959 |
| 2,936,384 | White | May 10, 1960 |
| 2,944,165 | Stuetzer | July 5, 1960 |
| 2,966,434 | Hibberd | Dec. 27, 1960 |
| 2,980,810 | Goldey | Apr. 18, 1961 |
| 2,980,832 | Stein et al. | Apr. 18, 1961 |
| 2,986,724 | Jaeger | May 30, 1961 |
| 3,018,392 | Jones et al. | Jan. 23, 1962 |
| 3,036,226 | Miller | May 22, 1962 |
| 3,040,191 | Bright | June 19, 1962 |